United States Patent [19]

Blatt et al.

[11] Patent Number: 4,518,187
[45] Date of Patent: May 21, 1985

[54] PARALLEL MOVEMENT GRIPPER HEAD

[75] Inventors: Leland F. Blatt, Grosse Pointe Shores; David J. Crorey, Utica, both of Mich.

[73] Assignee: Leland F. Blatt, Fraser, Mich.

[21] Appl. No.: 501,526

[22] Filed: Jun. 6, 1983

[51] Int. Cl.³ .......................... B66C 1/42; B25J 15/04
[52] U.S. Cl. .................................................... 294/88
[58] Field of Search ...................... 294/88, 116, 87.24, 294/104, 106, 115, 100, 118, 87 R; 269/32, 34, 257, 264; 414/739, 751, 753

[56] References Cited

U.S. PATENT DOCUMENTS 3,714,870  2/1973  Blatt ....................................... 294/88
4,252,361  2/1981  Descoteaux et al. ................ 294/88

Primary Examiner—James B. Marbert
Attorney, Agent, or Firm—Cullen, Sloman, Cantor, Grauer, Scott & Rutherford

[57] ABSTRACT

A workpiece gripper head comprises a body including side plates interiorly slotted on a longitudinal axis adapted to slidably support a selectively reciprocal rod end. A pair of opposed jaw assemblies are guidably mounted within the body and connected thereto for alternate inward and outward movements in a path at right angles to the axis. Each jaw assembly includes a pair of jaw plates having an angular cam slot and a pair of aligned guide slots at right angles to the longitudinal axis. A series of cam rollers upon the rod end are nested within the cam slots and additional rollers are mounted upon the side walls and nested within the guide slots whereby movement in the rod end in one direction moves the jaws towards each other and movement in the opposite direction moves the jaws away from each other.

12 Claims, 8 Drawing Figures

PARALLEL MOVEMENT GRIPPER HEAD

BACKGROUND OF THE INVENTION

In the machine tool industry and in the field of automation wherein workpieces are supported on a gripper head for movement into a machine or tool, for disengagement of the workpiece, retraction of the gripper head with subsequent advance of the gripper head gripping the finished workpiece and the subsequent retraction of the gripper head for removing the finished workpiece from the machine tool and for transporting the workpiece to a predetermined location. Various types of power operated cylinder assemblies which have been provided with associated gripper heads having pivotal jaws and wherein a power cylinder is employed for effecting reciprocal feed movements of the jaw assembly and for effecting opening and closing movements of the jaws.

THE PRIOR ART

Power operated jaw cylinders and workpiece gripper heads are shown in U.S. Pat. No. 3,714,870 dated Feb. 6, 1973 of Leland F. Blatt and U.S. Pat. No. 3,734,303 dated May 22, 1977 of Leland F. Blatt.

Heretofore in the prior art, various types of power cylinder operated gripper heads have been employed normally employing pivotal jaws adapted for operatively engaging and supporting a workpiece and for transporting a workpiece to and from a machine tool, for illustration.

SUMMARY OF THE INVENTION

An important feature of the present invention is to provide an improved parallel movement gripper head wherein supportably mounted within the gripper head body are a pair of opposed jaw assemblies so connected to a reciprocal power source as to effect simultaneous movements of the jaw assemblies in a path at right angles to the longitudinal axis of the body. The respective jaw assemblies have opposed jaw pads secured thereto on which workpiece engaging jaw fingers are mounted whereby movement of the power means in one direction moves the jaw pads towards each other and movement of the power means in the opposite direction moves the jaw pads away from each other.

A further feature contemplates the use of a pair of opposed jaw assemblies guidably interposed between the side plates of the gripper body with opposed jaw pads upon each jaw assembly, wherein each jaw assembly includes one or a pair of jaw plates guidably mounted upon the body for reciprocal movements in a path at right angles to the longitudinal axis of the body. A reciprocal rod end is guidably mounted upon the body and carries a series of transversely arranged rollers which movably and operatively extend within angular cam slots within the opposed jaw plates whereby movement of the rod end in one direction moves the jaw plates and associated jaw pads towards each other and movement in the opposite direction moves the jaw plates and corresponding jaw pads away from each other.

A further feature provides for a pair of opposed jaw assemblies guidably mounted upon the body of the gripper head wherein the opposed jaw pads are so mounted transversely of the projecting ends of the jaw plates that selectively the associated workpiece gripper fingers mounted on the jaw pads are adapted to engage the outside diameter of a workpiece or alternately the inside diameter of a workpiece for securing the workpiece to the jaw plates.

A further feature is to provide a pair of opposed jaw assemblies, each including a pair of parallel spaced jaw plates which are guidably nested within the body and at their ends project outwardly thereof and wherein opposed jaw pads are mounted upon the respective jaw plates and adapted for operative securing engagement with a workpiece. The respective opposed pairs of jaw plates have cam slots therein extending outwardly of the longitudinal axis of the body respectively together with corresponding vertically spaced slots within the jaw plates in association with transverse rollers mounted upon the side plates such that reciprocal movements of the rod end within the jaw body will effect corresponding simultaneous inward or outward gripping movements of the jaw assemblies.

These and other features and objects will be seen from the following specification and claims in conjunction with the appended drawings.

THE DRAWINGS

FIG. 4 is a side elevational view of the gripper head shown in FIG. 1 with the jaw pads separated from the workpiece.

FIG. 5 is a side elevational view of a parallel movement gripper head with the jaw assemblies located with respect to the interior diameter of a workpiece W fragmentarily shown.

FIG. 6 is a side elevational view on a reduced scale illustrating one of the jaw plates shown in FIG. 4.

It will be understood that the above drawings illustrate merely preferred embodiments of the invention and that other embodiments are contemplated within the scope for the claims hereafter set forth.

DETAILED DESCRIPTION OF AN EMBODIMENT OF THE INVENTION

Figure 1:
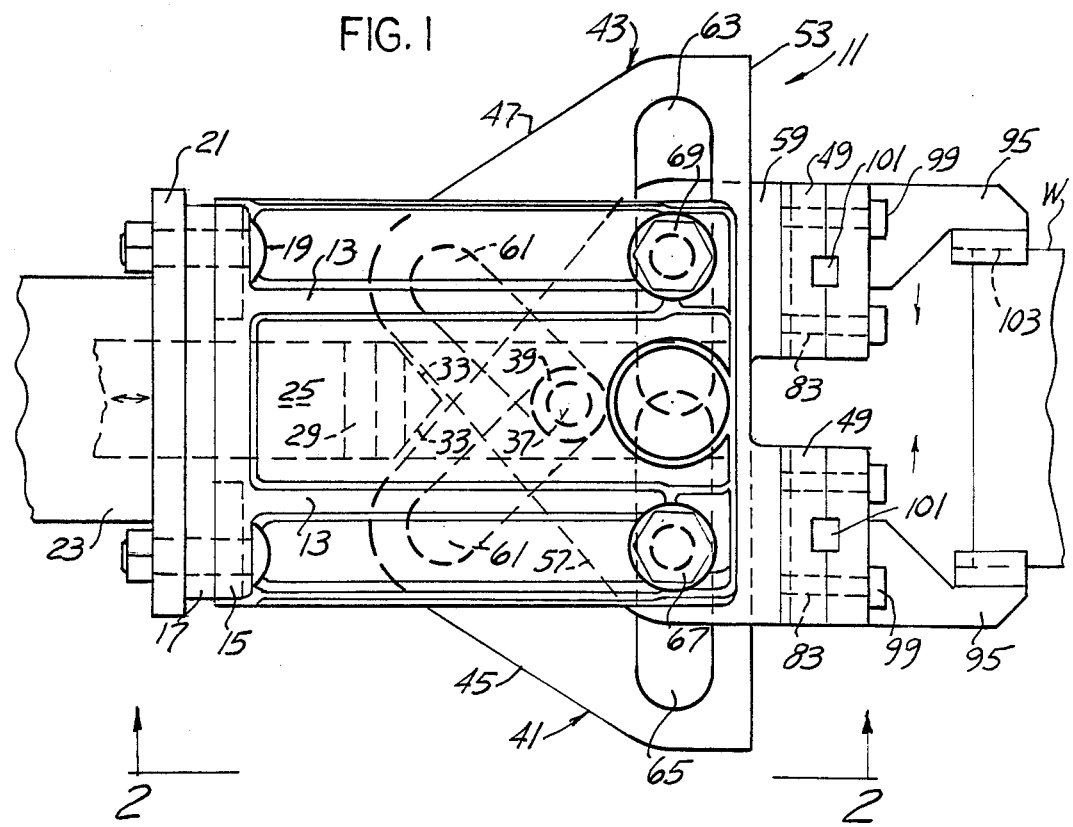
FIG. 1 is a partly sectioned side elevational view of a parallel movement gripper head with an attached power cylinder fragmentarily shown for gripping the outside diameter of a workpiece.
Figure 2:
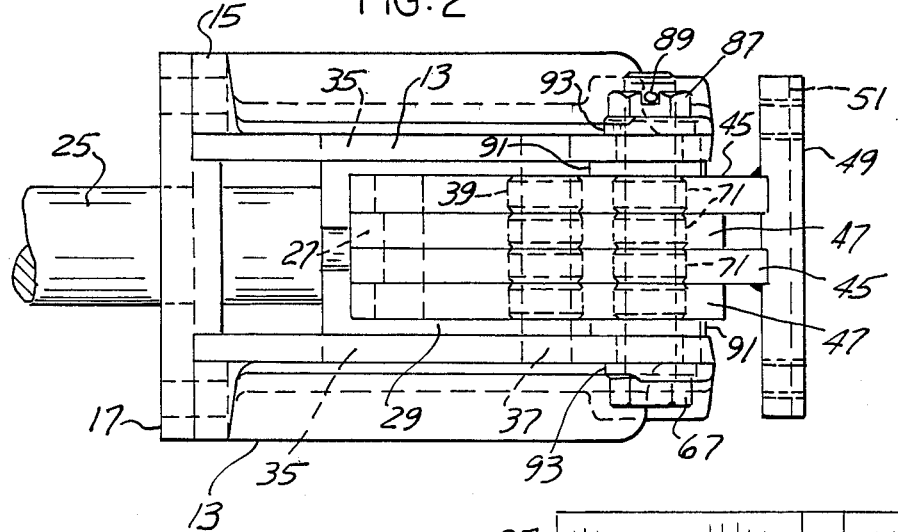
FIG. 2 is a bottom plan view thereof taken in the direction of arrows 2—2 of FIG. 1.

Referring to the drawings, the parallel movement gripper head 11 for a workpiece W, FIGS. 1 and 2, has an elongated body which includes a pair of laterally spaced side plates 13. Each of the side plates at one end terminates in a right angular anchor flange 15 adapted to receive fasteners 19 for securing to body end plate 17. Fasteners 19 extend through the mount flange 21 of the power cylinder 23, fragmentarily shown, which in the preferred embodiment is a pneumatic cylinder and includes a reciprocal piston rod 25.

Figure 3:
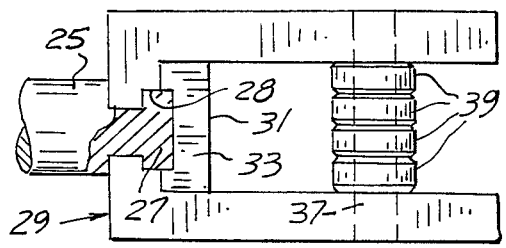
FIG. 3 is a plan view of the rod end shown in FIGS. 1 and 2 with a connected reciprocal piston rod fragmentarily shown.

The said piston rod at one end has a T-connector 27, FIG. 3, adapted for interlock with the T-slot 28 within one end of the rod end 29, which is of U-shape in plan as shown in FIG. 3. The rod end at one end has a transverse spacer 31 which includes a pair of forwardly extending converging guide walls 33, FIG. 1. Opposed elongated guide slots 35 are formed along the interior of the body side plates 13 and extend along a longitudinal axis adapted to slidably and guidably receive rod end 29, FIG. 8. Towards the forward end of the rod end there is mounted a transverse pivot pin 37 which spans the central opening of said rod end and mounts thereon a plurality of rollers 39 arranged side by side.

Figures 4, 5, 6:
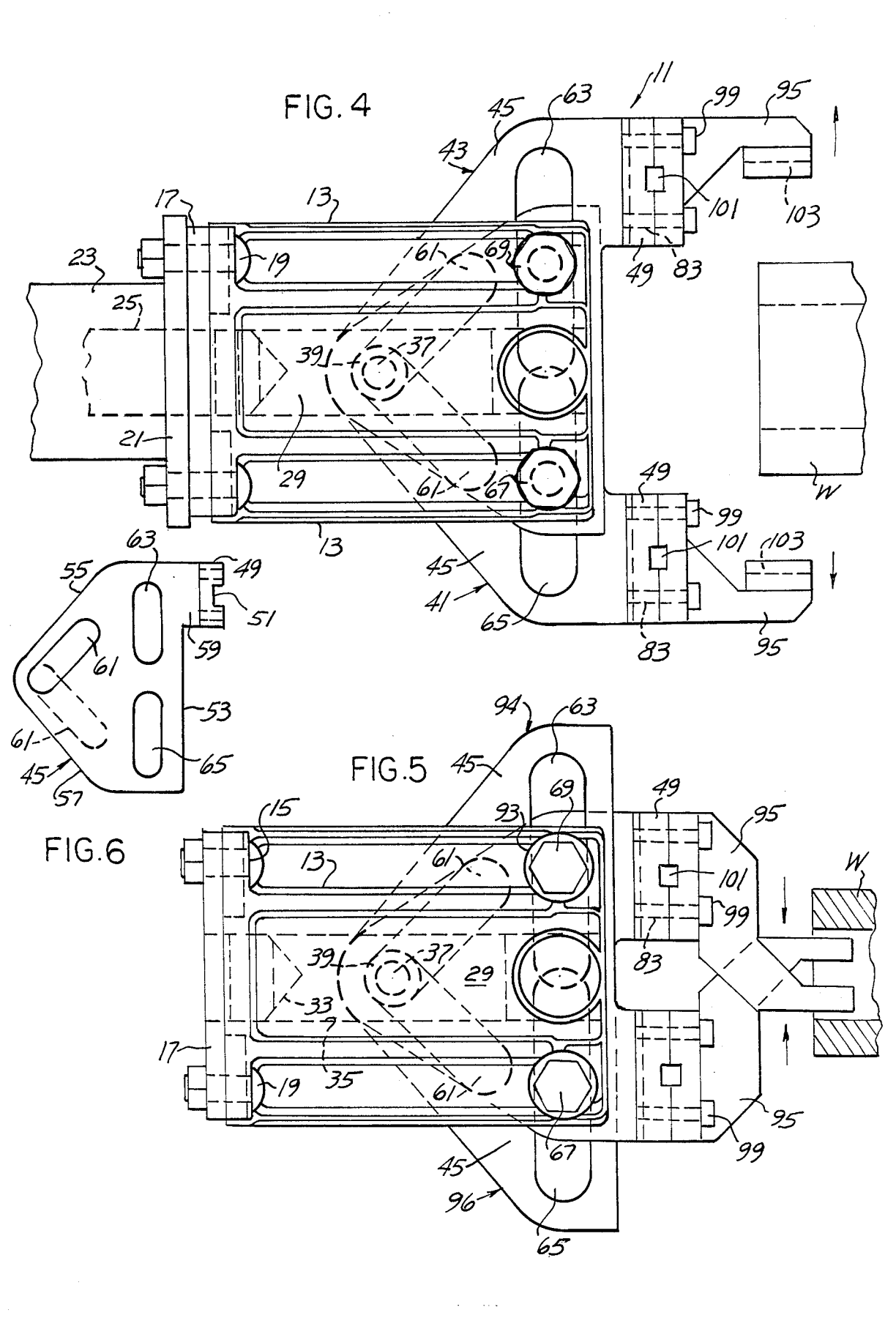

In FIG. 1 there is shown a pair of opposed jaw assemblies 41 and 43 sometimes referred to as bottom and top jaw assemblies. Each of the respective jaw assemblies include a pair of laterally spaced triangularly shaped jaw plates 45 and 47, FIGS. 2 and 6. Spanning and extending transversely to the ends of said jaw plates is the transverse jaw pad 49 having a transverse gripper finger anchor slot 51 across its front face, FIG. 8. In the illustrative embodiment, the respective jaw pads 49 for the top and bottom jaw assemblies are welded to the corresponding jaw plates 45 and 47, FIG. 2. One of the jaw plates 45 for the top outside diameter jaw assembly 41 is shown in FIG. 6. Each of said jaw plates has upright front side edge 53 and rearwardly extending angular sides edges 55 and 57. The upper end of the edge 53 of the jaw plate terminates in the pad projection 59 over which is positioned and secured the transverse jaw pad 49, FIG. 2.

The jaw plate 45 includes adjacent the angular edge 55, elongated cam control slot 61 sometimes referred to as an angular cam slot in the preferred embodiment extending at an angle of 45° to the horizontal. Formed through jaw plate 45 adjacent the upright edge 53 are a pair of aligned spaced transverse guide slots 63 and 65 adapted to receive the pair of aligned spaced pivot bolts 67 and 69, FIG. 1 and the rollers 71 thereon, FIG. 2.

These pivot bolts span and interconnect the forward ends of the body side plates 13 and are anchored by the corresponding nut 87 and cotter pin 89. While the jaw plate 45 in FIG. 6 corresponds to the upper jaw plate 45 of FIG. 4, the corresponding bottom jaw plate 45 in FIG. 4 is same construction, except that cam slot 61 is inclined forwardly and downwardly as shown in dash lines at 61.

The rollers 39 mounted upon pin 37 upon rod end 29 are assembled so as to be positioned respectively within the corresponding cam slots 61 in the corresponding laterally spaced pairs of jaw plates 45 and 47, FIG. 2. Mounted upon the corresponding pair of transverse aligned pivot bolts 69 inwardly of the side walls 13 of the gripper body are a plurality of guide rollers 71, FIG. 2 nested within the corresponding upright guide slots 63 and 65 of each of the jaw plates 45 and 47.

While the respective jaw assemblies 4 and 43 each include laterally spaced jaw plates 45 and 47, the corresponding jaw plates for the top and bottom jaw assemblies are alternated, FIG. 2, snugly positioned within and between the side plates 13 of the body. Corresponding spacers 91 are mounted upon the respective pivot bolts 67 and 69 and interposed between the outermost jaw plates 45 and 47 and the interior surface of the body side plates 13, FIG. 2. Also mounted upon each of the pivot bolts 67 and 69 outwardly of the corresponding side plates 13 and adjacent the nuts 87 are corresponding bushings 93.

Figure 8:
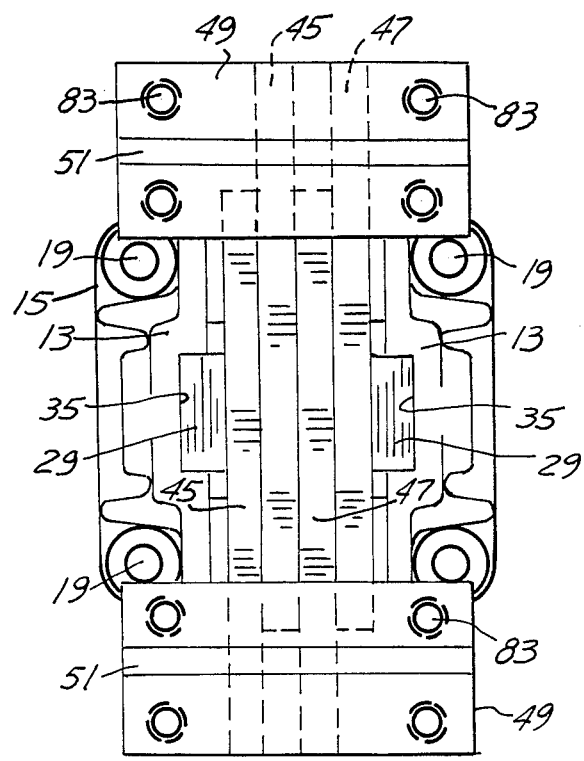
FIG. 8 is an end view taken in the direction of arrows 8—8 of FIG. 7.

As shown in the drawings and particularly in FIG. 8, each of the corresponding opposed aligned jaw pads 49 have in their front faces a series of spaced threaded apertures 83. Schematically shown in the drawings are corresponding workpiece gripper fingers 95. Said gripper fingers are normally custom made for a particular job. Across the rear surface of each gripper finger is a transverse key 101 adapted for nesting within the corresponding jaw pad slot 51. The respective gripper fingers are secured to the jaw pads by a plurality of fasteners 99.

In the embodiment shown in FIGS. 1 and 4, the parallel movement gripper head is adapted for retaining engagement with the outside diameter of the workpiece W, fragmentarily shown. Accordingly, opposing inner edges 103 of the gripper fingers 95 are transversely concave and adapted for cooperative compressive and retaining registry with the cylindrical workpiece W. It is contemplated, depending upon the shape of the workpiece, that the custom made gripper fingers 95 will have interior opposing surfaces of a shape to correspond to the shape of the workpiece to be gripped therebetween.

Figure 7:
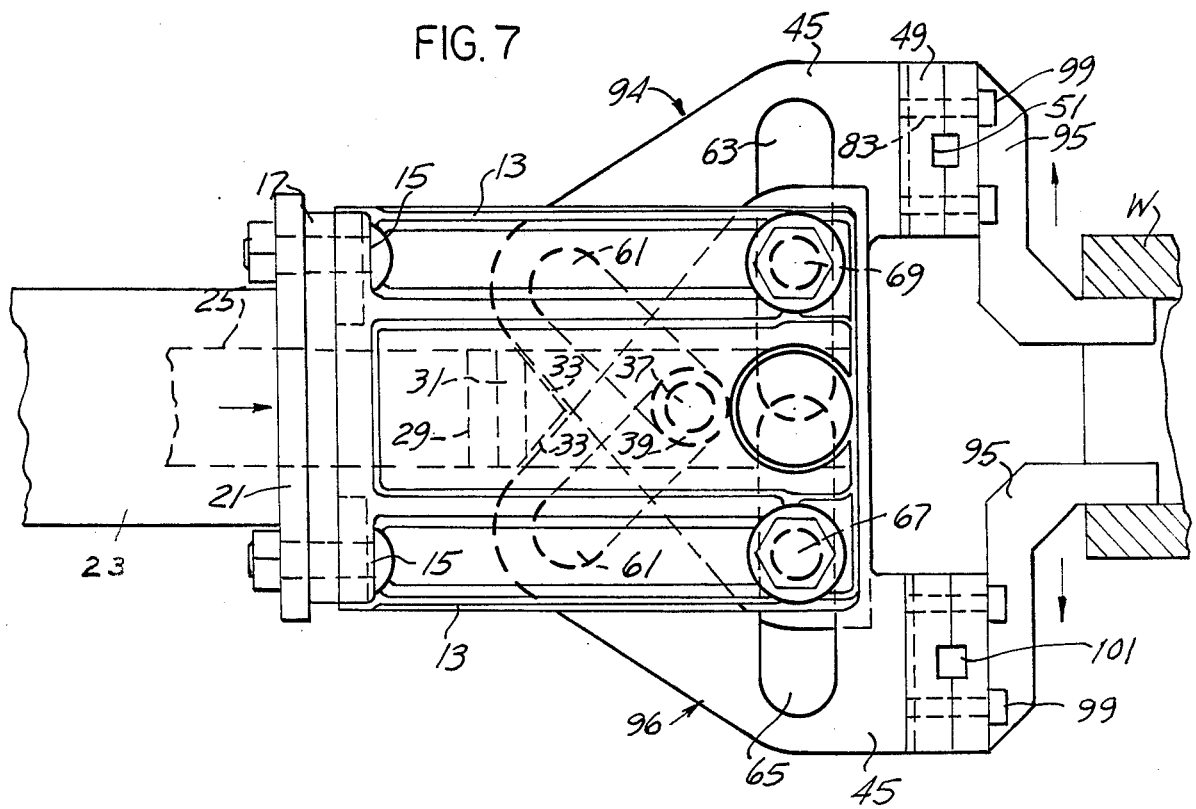
FIG. 7 is a similar view of the gripper head of FIG. 5 with the jaw assemblies projected outwardly for retaining engagement with the interior diameter of a workpiece, fragmentarily shown.

In the corresponding parallel movement gripper head shown in FIGS. 5 and 7, the respective inside diameter top and bottom jaw assemblies 94 and 96 are of the same construction as described with respect to the jaw assemblies 41 and 43 of FIG. 4. The difference is that the corresponding jaw pads and associated workpiece gripper fingers 95 are arranged so as to operatively engage the interior diameter of the workpiece W. In all other respects, the construction of the gripper head shown in FIGS. 5 and 7 is the same as that above described with respect to FIGS. 1 and 4, except that the operation is the reverse.

For example, referring to FIG. 4, the outside diameter upper and lower jaw assemblies 41, 43 are shown outwardly retracted with the rod end 29 in a retracted position. When the power cylinder 23, preferably a pneumatic cylinder is energized, the piston rod 25, fragmentarily shown FIGS. 2 and 3 advances the rod end 29 and the rollers 39 within the corresponding cam slots 61 of the respective top and bottom jaw plates. Said rollers ride along the corresponding cam slots causing the jaw plates 45 and 47 to move towards each other. The workpiece gripper fingers 95 retainingly engage the outside diameter of workpiece W in FIG. 1.

The cam slot at the top in FIG. 4 is now the bottom cam slot in FIG. 1 and the corresponding cam slot 61 at the bottom of FIG. 4 is now the upper cam slot in FIG. 1.

The respective jaw plates 45 and 47 are constrained by the guide slots 63, 65 and the corresponding rollers 71 on pivot bolts 67 and 69 for corresponding movements in unison, either towards each other in FIG. 1 or away from each other, FIG. 4 in a path at right angles to the longitudinal axis of the gripper body.

The present gripper head provides a parallel gripping motion for the jaw pads 49 and the connected custom made workpiece engaging fingers 95 for gripping a workpiece W having an outside diameter, FIG. 1 or the workpiece W, FIG. 7, having an inside diameter to be engaged. The clamping forces applied are relative to the cylinder piston rod force which is applied to rod end 29.

The rollers 39 attached to the rod end move within the angular cam slots 61 which extend forwardly and outwardly upon opposite sides of the longitudinal axis of the body.

With the piston rod 25 extended as in FIG. 1, clamping will be accomplished upon the outside diameter of the workpiece W. With the piston rod 45 retracted in FIG. 4, the workpiece W is released with the corresponding jaw pads moved simultaneously outward.

Comparing FIGS. 5 and 7 with FIGS. 1 and 4, it appears that the corresponding cam slots 61 for the corresponding clamp plates are reversed so that when the piston rod 25, is retracted, FIG. 5, corresponding I.D. jaw assemblies 94 and 96 have been moved inwardly in a path at right angles to the longitudinal axis of the gripper head body. On advancing of the rod end 29 to the position shown in FIG. 7, the corresponding clamp plates have been simultaneously moved radially outward with the corresponding workpiece gripper fingers 95 in operative engagement with the interior diameter portion of workpiece W. Accordingly, the custom made gripper fingers 95 for the particular clamping job are shaped at their ends to correspond to the corresponding interior diameter or other surface of the workpiece.

The respective jaw plates 45 and 47, are guided for inward and outward movements with respect to the opposed aligned slots 63 and 65 therethrough as positioned upon the rollers 71, FIG. 2, mounted upon the corresponding pivot bolts 67 and 69.

Since the angular cam slots 61 do not change position with respect to the corresponding jaw plate, the gripping force of the mechanical action does not change in any position of the stroke relative to the clamping force.

Having described our invention, reference should now be had to the following claims:

We claim:

1. A parallel movement gripper head comprising of a body including a pair of parallel spaced side plates interconnected at their one ends;
    there being a pair of opposed guide slots upon their interiors along a longitudinal axis;
    a longitudinally reciprocal rod end spanning and slidably mounted within said slots and adapted for connection to a reciprocal piston rod of a power cylinder adapted for connection to said body;
    a pair of opposed jaw assemblies interposed between said side plates, guidably mounted upon said body and adapted for simultaneous alternate inward and outward movements in a path at right angles to said axis;
    each jaw assembly including a pair of parallel spaced jaw plates nested within said body and at their one ends projecting outwardly thereof;
    opposed jaw pads for each jaw assembly respectively, extending transversely of and spanning said one ends of said jaw plates and secured thereto, adapted for operatively securing engagement with a workpiece;
    each jaw plate having a cam slot extending at an acute angle to said axis and a pair of aligned guide slots extending at right angles to said axis;
    the cam slots of each pair of jaw plates being inclined outwardly upon opposite sides of said longitudinal axis, respectively;
    a plurality of roller means mounted upon said rod end on an axis transverse to said longitudinal axis and respectively nested within said cam slots;
    and a spaced pair of a plurality of aligned roller means mounted upon and spanning said side plates adjacent their other ends on spaced axes at right angles to said longitudinal axis and respectively nested within said guide slots, whereby movement of said rod end in one direction moves said jaw pads towards each other and movement in the opposite direction moves said jaw pads away from each other.

2. In the gripper head of claim 1, each of said side plates at one end having an outturned apertured anchor flange;
    and an apertured end plate adapted to receive said piston rod, spanning said anchor flanges and secured thereto.

3. In the gripper head of claim 1, said pair of aligned roller means including a pair of spaced pivot bolts spanning and connected to said side plates and extending through said guide slots respectively;
    and a plurality of rollers mounted side by side upon each pivot bolt and nested within said guide slots respectively.

4. In the gripper head of claim 1, said jaw plates being arranged side by side;
    the jaw plates of one jaw assembly being alternated with the jaw plates of the other jaw assembly.

5. In the gripper head of claim 3, spacers upon said pivot bolts interposed between the outer jaw plates and side plate, for guiding the reciprocal movements of said jaw plates relative to said body.

6. In the gripper head of claim 3, bushings retained upon the ends of said pivot bolts in cooperative engagement with said side plates outwardly thereof.

7. In the gripper head of claim 1, each jaw plate being substantially triangular in shape, with its leading edge being upright and adjacent said guide slots and its other edges being inclined rearwardly adjacent said cam slot.

8. In the gripper head of claim 7, each leading edge of said jaw plates having a pad projection at its outer end, said jaw pads of each jaw assembly being secured to the corresponding spaced pairs of pad projections.

9. In the gripper head of claim 1, each of said jaw pads having an elongated slot transverse of said longitudinal axis and a plurality of apertures therethrough;
    the securing of said jaw pads to a workpiece including a pair of opposed jaw fingers having a transverse ridge nested within said jaw pad slots respectively and secured thereto.

10. In the gripper head, claim 1, a spacer adjacent one end of said rod end having a pair of upwardly and forwardly inclined guide surfaces, whereby upon advancing of said rod end, the respective guide surfaces operatively bear against said jaw plates respectively.

11. In the gripper head of claim 9, said pair of jaw fingers being adapted for selective mounting upon said jaw plates for cooperative engagement respectively with the outer diameter and inside diameter of workpieces selectively.

12. A parallel movement gripper head comprising of a body including a pair of parallel spaced side plates interconnected at their one ends, there being a pair of opposed guide slots upon their interiors along a longitudinal axis;
    a longitudinally reciprocal rod end spanning and slidably mounted within said slots and adapted for connection to a reciprocal piston rod of a power cylinder;
    a pair of opposed jaw assemblies interposed between said side plates, guidably mounted upon said body and adapted for simultaneous alternate inward and outward movements in a path at right angles to said axis;
    each jaw assembly including jaw plate nested within said body and at its one end projecting outwardly thereof;

opposed jaw pads for each jaw assembly respectively, extending transversely of the one end of said jaw plate and secured thereto, adapted for operatively securing engagement with a workpiece;

each jaw plate having a cam slot extending at an acute angle to said axis and a pair of aligned guide slots extending at right angles to said axis;

the cam slot of each jaw plate being inclined outwardly upon opposite sides of said longitudinal axis, respectively;

a plurality of rollers mounted upon said rod end on an axis transverse to said longitudinal axis and respectively nested within said cam slots;

and a spaced pair of a plurality of aligned rollers mounted upon and spanning said side plates adjacent their other ends on spaced axes at right angles to said longitudinal axis and respectively nested within said guide slots, whereby movement of said rod end in one direction moves said jaw pads towards each other and movement in the opposite direction moves said jaw pads away from each other.

* * * * *